(12) United States Patent
Stern

(10) Patent No.: US 12,141,395 B2
(45) Date of Patent: *Nov. 12, 2024

(54) DETECTION WITH A CAPACITIVE BASED DIGITIZER SENSOR

(71) Applicant: Microsoft Technology Licensing, LLC, Redmond, WA (US)

(72) Inventor: Yuval Stern, Even-Yehuda (IL)

(73) Assignee: Microsoft Technology Licensing, LLC, Redmond, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/752,815

(22) Filed: May 24, 2022

(65) Prior Publication Data

US 2022/0404945 A1 Dec. 22, 2022

Related U.S. Application Data

(63) Continuation of application No. 14/647,511, filed as application No. PCT/IL2013/050975 on Nov. 27, 2013, now Pat. No. 11,340,731.

(60) Provisional application No. 61/730,072, filed on Nov. 27, 2012.

(51) Int. Cl.
G06F 3/041 (2006.01)
G06F 3/044 (2006.01)
G06F 3/047 (2006.01)

(52) U.S. Cl.
CPC .......... *G06F 3/04182* (2019.05); *G06F 3/044* (2013.01); *G06F 3/047* (2013.01); *G06F 2203/04111* (2013.01); *G06F 2203/04112* (2013.01)

(58) Field of Classification Search
USPC ....................................................... 345/174
See application file for complete search history.

(56) References Cited

U.S. PATENT DOCUMENTS

| 11,340,731 B2* | 5/2022 | Stern .................. G06F 3/04182 |
| 2011/0115729 A1* | 5/2011 | Kremin ............... G06F 3/0445 345/173 |
| 2011/0134076 A1* | 6/2011 | Kida .................... G06F 3/0412 345/174 |

\* cited by examiner

*Primary Examiner* — Jimmy H Nguyen
(74) *Attorney, Agent, or Firm* — Barta Jones, PLLC

(57) ABSTRACT

A method for capacitive based detection with a digitizer sensor including a plurality of conductive elements that are capacitively coupled is described. The method includes generating a drive signal including transient sections separated in time by flat sections, providing the drive signal generated to at least one conductive element of the digitizer sensor, and sampling outputs transferred to a second conductive element that is capacitively coupled to the at least one conductive element in response to providing the signal generated to the at least one conductive element. The sampling events of the sampling are timed to take place both in response to the transient sections of the drive signal and to the flat sections of the drive signal.

20 Claims, 8 Drawing Sheets

DETECTION WITH A CAPACITIVE BASED DIGITIZER SENSOR

CROSS-REFERENCE TO RELATED APPLICATION

This application is a continuation application of and claims priority to U.S. patent application Ser. No. 14/647,511 (now U.S. Pat. No. 11,340,731), entitled "DETECTION WITH A CAPACITIVE BASED DIGITIZER SENSOR," filed on May 27, 2015, which claims priority to PCT Application No. PCT/IL2013/050975, entitled "DETECTION WITH A CAPACITIVE BASED DIGITIZER SENSOR," filed on Nov. 27, 2013, which claims priority to U.S. Provisional Patent Application No. 61/730,072, entitled "DETECTION WITH A CAPACITIVE BASED DIGITIZER SENSOR," filed on Nov. 27, 2012, the disclosures of which are incorporated herein by reference in their entireties.

FIELD AND BACKGROUND OF THE INVENTION

The present invention, in some embodiments thereof, relates to detection with a capacitive based digitizer sensor and, more particularly, but not exclusively, to noise suppression methods for detection with a capacitive based digitizer sensor.

Capacitive based digitizer sensors are known to be used in various human interface devices. Typically, capacitive based digitizer sensors use human body capacitance such as from a fingertip as input. Some capacitive based digitizer sensors are integrated with a display screen. The detected position of a finger or another body part provides input to a computing device associated with the display, and is interpreted by the computing device as commands or input to commands. Examples of such devices include Personal Computers (PCs) including tablet PCs, pen enabled laptop computers, personal digital assistants (PDAs) or any hand held devices such as digital audio players and mobile phones.

Capacitive based digitizer sensors are subject to picking up noise from the surrounding environment for example due to magnetic and/or electric fields generated by LCD screen, fluorescent lighting, power suppliers and/or other sources.

U.S. Pat. No. 5,691,512 entitled "Position Transducer, and method for eliminating noise therefore," the content of which is incorporated herein by reference, describes a position transducer, and a noise elimination method for eliminating a noise component included in a received signal of the position transducer. The position transducer is provided with a subtraction means which extracts an amplitude level corresponding to the signal developed in the loop coil resulting only from the electromagnetic interaction, for each loop coil, by subtracting a noise level obtained from a signal received when a transmission means interrupts transmission, from a signal received when the transmission means carries out transmission.

U.S. Pat. No. 7,843,439, entitled "Touch Detection for a Digitizer" assigned to N-Trig Ltd., the contents of which is incorporated herein by reference, describes a digitizing system including a transparent digitizer sensor overlaid on a flat panel display (FPD). The transparent digitizing sensor includes a matrix of vertical and horizontal conductive lines for sensing location of one or more of a stylus and/or a finger. Input to the digitizer sensor includes one or more of electromagnetic (EM) transmission from the stylus touching the sensing surface and capacitive coupling due to a conductive object such as a finger touching the screen. Location of a finger is detected by triggering one conductive line at a time along one axis of the grid and detecting output in response to each signal applied from a plurality of conductive lines along the other axis. A tabulation of capacitance values detected at each junction while no finger or stylus is present is stored and used to correct readings at each conductor during detection. The digitizing system is capable of detecting position of simultaneous occurrences of multiple styluses and/or multiple finger touches.

U.S. Patent Application Publication No. 20130027361 entitled "Noise reduction in digitizer system," assigned to N-Trig Ltd., the content of which is incorporated herein by reference, describes a method for noise reduction in a digitizer that is operative to detect both an electromagnetic signal as from a stylus and finger touch. The method includes determining a location of a stylus with a known frequency of emission over a first sampling period, sampling output from a plurality of detecting elements over a second sampling period, identifying detecting elements with sampled output in the second sampling period above a defined threshold in a selected frequency, the selected frequency being close to but different than the known frequency of the stylus, selecting as a candidate carrier of mere noise a detecting element from the detecting elements identified that is spaced away from the determined location of the stylus, and reducing values of output sampled over the second sampling period from at least one other detecting element, in accordance with the output sampled over the second sampling period from the detecting element selected as the candidate carrier of mere noise.

SUMMARY OF THE INVENTION

According to an aspect of some embodiments of the present invention there is provided a method for detecting noise signals picked up by a capacitive based digitizer sensor during fingertip detection or the like, and using the detected noise signal to suppress a noise component in a concurrently sampled second signal including information for the fingertip detection or the like, e.g. a detection signal. According to some embodiments of the present invention, the noise signal is detected on a same conductive line as the concurrently sampled second signal. According to some embodiments of the present invention, time domain multiplexing is used to alternate between sampling the noise signal and the second signal.

According to an aspect of some embodiments of the present invention there is provided a method for reducing the number of iterations required for scanning a capacitive based digitizer sensor that is operated for mutual capacitive sensing. According to some embodiments of the present invention, a plurality of conductive lines are simultaneously triggered with sections of triggering and/or drive pulses that are interlaced so that only one drive pulse from the plurality excites the digitizer sensor at any given point in time. According to some embodiments of the present invention, time domain multiplexing is used to obtain output responsive to triggering each of the plurality of conductive lines. Optionally, at least a portion of the plurality of conductive lines is simultaneously triggered with different frequency signals and frequency domain multiplexing is applied to separate output responsive to the different frequency signals.

An aspect of some embodiments of the present invention provides for a method for capacitive based detection with a digitizer sensor including a plurality of conductive elements that are capacitively coupled, the method comprising: generating a drive signal including transient sections separated in time by flat sections; providing the drive signal generated to at least one conductive element of the digitizer sensor; and sampling outputs transferred to a second conductive element that is capacitively coupled to the at least one conductive element in response to providing the signal generated to the at least one conductive element, wherein the sampling events of the sampling are timed to take place both in response to the transient sections of the drive signal and to the flat sections of the drive signal.

Optionally, the method includes using outputs sampled in response to the flat sections to suppress noise in outputs sampled in response to the transient sections.

Optionally, the method includes subtracting amplitudes of outputs sampled in response to the flat sections from amplitudes of outputs sampled in response to the transient sections of the drive signal.

Optionally, the subtracting is performed between pairs of contiguous outputs.

Optionally, the noise is a signal emitted by a stylus interacting with the digitizer sensor.

Optionally, the method includes timing the sampling events occurring in response to the flat sections to occur after responses of the second conductive element to previous transient sections of the drive signal have faded.

Optionally, the method includes timing the sampling events occurring in response to the flat sections to occur substantially at an onset of the transient sections of the drive signal.

Optionally, the method includes timing the sampling events of the sampling to alternate between occurring in response to the transient sections of the drive signal and occurring in response to the flat sections of the drive signal.

Optionally, the method includes timing the sampling events of the sampling to alternate between occurring twice in response to each of a plurality of the transient sections of the drive signal and occurring once in response to each of a plurality of the flat sections of the drive signal.

Optionally, durations of the flat sections in the drive signal are defined to be irregular.

Optionally, the drive signal is an oscillating signal that is periodically interrupted by a flat signal.

Optionally, the oscillating signal is a sinusoidal signal with frequency lower than a frequency of occurrences of the flat sections.

Optionally, the method includes generating a plurality of drive signals, wherein each drive signal includes transient sections separated in time by flat sections; and applying time domain multiplexing for sampling the outputs in response the plurality of drive signals on the second conductive element.

Optionally, each of the plurality of drive signals includes an oscillating signal that is periodically interrupted by a flat signal.

Optionally, a same oscillating frequency of the oscillating signal is use to generate each the drive signals.

Optionally, at least two drive signals have an oscillating signal with different oscillating frequency.

Optionally, the digitizer sensor includes a first set of parallel conductive lines and second set of parallel conductive lines, the first and second set of conductive lines arranged in a grid pattern.

Optionally, the at least one conductive element is a conductive line from the first set of parallel conductive lines and second conductive element is a conductive line from the second set of parallel conductive lines.

Optionally, the method includes sampling output on all the conductive lines from the second set of parallel conductive lines in response to providing the drive signal.

As aspect of some embodiments of the present invention provides a method for capacitive based detection with a digitizer sensor including a plurality of conductive elements that are capacitively coupled, the method comprising: generating a plurality of drive signals, wherein each drive signal of the plurality of drive signals includes an oscillating signal that is intermittently interrupted by flat segments; simultaneously providing the plurality of drive signals to a plurality of conductive elements, wherein each drive signal of the plurality is provided to a different conductive element of the plurality of conductive elements; and applying time division multiplexing for sampling outputs on a second conductive element in response to transient periods of each of the plurality of drive signals.

Optionally, the oscillating frequency of the oscillating signals of each of the drive signals is the same.

Optionally, the oscillating signal includes more than one oscillating frequency.

Optionally, the oscillating frequency of at least two oscillating signals are orthogonal frequencies.

Optionally, the method includes applying frequency domain multiplexing for sampling outputs on the second conductive element in response to transient periods of the at least two drive signals occurring simultaneously.

Optionally, the digitizer sensor includes a first set of parallel conductive lines and second set of parallel conductive lines, the first and second set of conductive lines arranged in a grid pattern.

Optionally, the plurality of conductive elements are a plurality of conductive lines from the first set of parallel conductive lines and the second conductive element is a conductive line from the second set of parallel conductive lines.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DESCRIPTION OF SPECIFIC EMBODIMENTS OF THE INVENTION

The present invention, in some embodiments thereof, relates to detection with a capacitive based digitizer sensors and, more particularly, but not exclusively, to noise suppression methods for detection with a capacitive based digitizer sensor.

Figure 1:
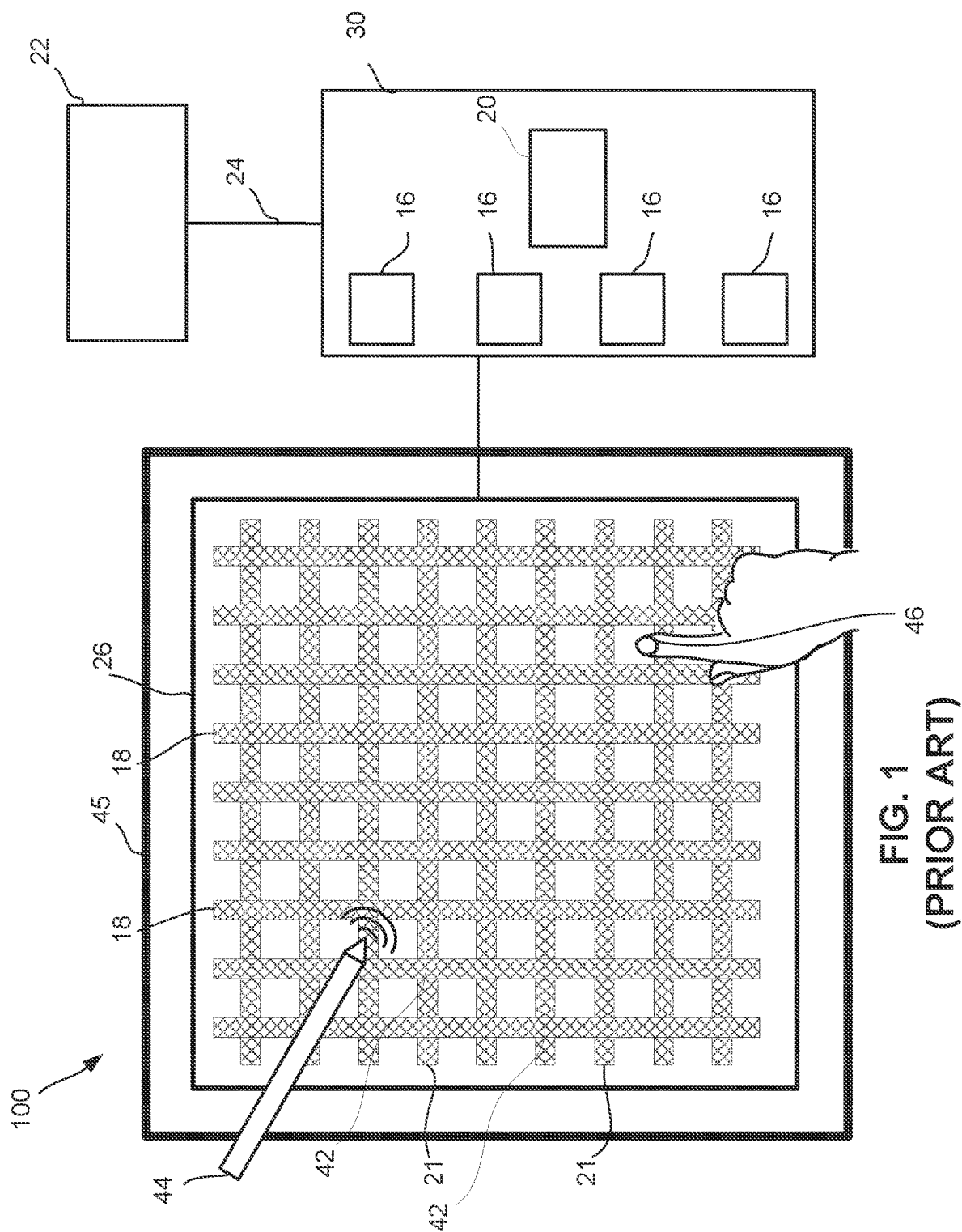
FIG. 1 is a simplified block diagram of an exemplary digitizer system as known in the art.

For purposes of better understanding some embodiments of the present invention, as illustrated in FIGS. 2-7 of the drawings, reference is first made to the construction and operation of a capacitive based digitizer sensor as illustrated in FIG. 1. FIG. 1 shows a block diagram of an exemplary digitizer system 100 including a mutual capacitive sensor 26. Mutual capacitive sensor 26 includes a patterned arrangement of row conductive strips 21 and column conductive strips 18 arranged in a grid. Typically, row conductive strips 21 and column conductive strips 18 are electrically isolated from each other but have a capacitive connection in and/or around junction areas 42.

Optionally, capacitive sensor 26 is transparent so that it can be overlaid on a display 45, e.g. flat panel display (FPD). In transparent capacitive sensors, conductive strips 18 and 21 are formed with conductive transparent materials, or are thin enough so that they do not substantially interfere with viewing an electronic display placed behind conductive strips 18. Conductive strips 18 and 21 are typically patterned on a substrate of glass, polyethylene terephthalate (PET) foil and/or other non-conductive substrate in one or more layers. Alternatively, conductive strips 18 may be patterned on one layer and conductive strips 21 may be patterned on another layer, wherein the two layers are isolated from one another.

During operation of digitizer system 100, digital unit 20 and/or integrated circuits (ICs) 16 typically produce and send an interrogation signal, drive signal or pulse to conductive strips along one axis, e.g. conductive strips 21 and sample output from the other axis, e.g., conductive strips 18. In some exemplary embodiments, finger touch detection is facilitated when sending a triggering pulse to a conductive strip. In some embodiments, the conductive strips along one axis are interrogated in a consecutive manner, and in response to each interrogation, output from the conductive strips on the other axis are sampled. This scanning procedure provides for obtaining output associated with each junction 42 of sensor 26. Typically, the interrogation, drive and/or triggering signal is a transient signal, an oscillating signal, a pulse and/or a series of pulses formed from any AC signal like a sinusoidal waveform, a square waveform, or the like. Typically, this procedure provides for detecting one or more conductive objects, e.g. fingertip 46 touching and/or hovering over sensor 26. More than one fingertip 46 and/or other capacitive object, e.g. a token can be detected at the same time (multi-touch) based on this scanning procedure.

Typically, the sampled output is the interrogation signal that crossed at junctions 42 between row and column conductive strips due to mutual capacitance formed around junctions 42. Typically, base-line amplitude is detected in the absence of any objects interacting with sensor 26. Typically, the presence of fingertip 46 decreases the amplitude of the coupled signal by 5-30%. Typically, presence of fingertip 46 produces a peak shaped location profile, e.g. a negative peak and/or a trough with a base that generally covers and may extend around a contact area of fingertip 46 on touch sensor 26. Optionally, when fingertip 46 hovers over sensor 26, the location profile obtained is typically lower as compared to location profile obtained during touch.

Some known mutual capacitive sensors support both fingertip detection and detection of a signal transmitting stylus 44. Typically, a signal emitted by stylus 44 is detected by sensor 26 without requiring triggering, e.g. driving conductive lines of sensor 26 with an interrogation signal. Typically, a signal emitted by stylus 44 is picked up by conductive lines close to a transmission point on stylus 44, e.g., close to a transmitting tip of stylus 44. Typically, amplitude of output sampled from conductive lines close to stylus 44 increases by 1-200%, depending on the stylus transmission power and the resistance of the input interface, e.g. sensor 26.

Typically, a signal frequency of the signal transmitted by the stylus is selected to be differentiated from a signal frequency of the interrogation signal used to detect fingertip 46. Typically, ICs 16 sample output, substantially simultaneously, from both row conductive strips 21 and column conductive strips 18 and based on the sampled output location of stylus 44 with respect to digitizer sensor 26 is determined. Typically, sampling output for stylus detection is performed while digitizer sensor 26 is dormant, e.g. while ICs 16 together with digital unit 20 are not transmitting interrogation signals through digitizer sensor 26.

According to some embodiments of the present invention, digital unit 20 together with ICs 16 are mounted on one or more PCBs 30 in proximity to display 45 and serve as the controller of the digitizer system and/or has functionality of a controller and/or a processor. Output from the digitizer sensor is forwarded to a host 22 via an interface 24 for processing by the operating system or any current application. Optionally, at least part of the processing is performed by host 22. Typically, digital unit 20 reports location of any fingertips 46 and/or styluses interacting with sensor 26 to host 22. Optionally, identity of an object, e.g. finger or stylus interacting with sensor 26 is also reported to host 22.

Digitizer systems similar to digitizer system 100 are described with further details, for example in incorporated in U.S. Pat. Nos. 6,690,156, 7,292,229, and/or 7,372,455, the full contents of which are all incorporated herein by reference.

U.S. Pat. No. 7,902,840 entitled "Apparatus for object information detection and methods of using same", assigned to N-Trig Ltd., the contents of which is also incorporated herein by reference, describes an additional method for detecting one or more objects on a sensor sensitive to capacitive coupling. The method includes for example, using a plurality of frequencies, e.g. orthogonal frequencies to simultaneously interrogate a plurality of electrodes. Outputs responsive to capacitive coupling formed between the plurality of electrodes and crossing electrodes are sampled. Outputs obtained from each of the plurality of frequencies are separated and locations of the one or more objects along the plurality of electrodes interrogated are detected from the sampled signals.

It is appreciated that the present invention is not to be limited to the technical description of the digitizer system and methods for detection described herein. The present invention may also be applicable to other digitizer systems depending on their construction and/or to other methods for detection with a touch screen.

According to some embodiments of the present invention, there is provided a method for detecting noise signals on conductive lines of a capacitive based digitizer sensor even while a finger or conductive object is interacting with the digitizer sensor. According to some embodiments of the present invention, the noise signal is sampled substantially simultaneously with a detection signal for detecting presence of one or more fingers and/or other capacitive based objects, and is used to suppress noise on the detection signal. As used herein, the term detection signal refers to a signal transferred to one conductive element of a digitizer sensor in response to triggering another second conductive element of the sensor that is capacitively coupled to the first conductive element.

Typically, time domain multiplexing is applied for sampling the noise signal together with the detection signal on each of the conductive lines sampled. The present inventor has noted that a capacitive effect of fingertip interaction with the digitizer sensor is only present when the digitizer sensor is excited, e.g. interrogated with an transient signal and/or pulse, e.g. an oscillating signal, while the noise signal is typically picked up by digitizer sensor at all times regardless of whether the sensor is triggered with a transient signal or is passive. Based on this observation, the present inventor has found that noise in the detection signal sampled in response to triggering can be separately detected during periods in which the digitizer sensor is passive, dormant and/or in steady-state. Typically, the digitizer sensor is passive, dormant and/or at steady-state during periods when no triggering signal is transmitted through the digitizer sensor or only a DC signals is transmitted through the digitizer sensor. Typically, a response of the digitizer sensor to a triggering signal is required to fade before a dormant, passive state of the digitizer sensor can be reached.

Optionally, when sampling the noise signal substantially simultaneously with sampling of the detection signal, the noise signal detected can be used as a close approximation of the noise component of the detection signal and can be subtracted therefrom to suppress noise. Typically, this is the case for noise in frequencies that are low in comparison to a sampling rate of the noise signal. Optionally, low pass filtering is additionally applied for suppressing higher frequency noise. It is noted that subtraction can be analog, e.g. using a sample hold method for holding noise output and then using with a differential amplifier and/or digital. Optionally subtraction can be performed after reconstruction the signal.

According to some embodiments of the present invention, substantially simultaneous sampling over a sampling period is accomplished by applying a driving pulse that is formed with alternating transient and flat sections, e.g. DC sections. Optionally, the alternating transient and DC sections are formed with a series of spaced pulses. Optionally, the alternating transient and DC sections are formed by intermittently blanking portions of an oscillating signal typically used for triggering the digitizer sensor. According to some embodiments of the present invention, sampling is coordinated with the blanking pattern and/or the resultant drive signal so that during a single sampling period, output is alternately sampled during dormant points of time (DC sections) and during active points of time (AC sections). Optionally, portions of the drive signal and/or pulse are blanked by multiplying the oscillating signal with a square wave alternating between two DC levels. Typically, outputs sampled during passive periods provide the noise signal while outputs sampled during active periods and/or sensor transit due to the active period provide the detection signal.

In some exemplary embodiments, sampling during passive periods is coordinated to occur toward an end of a blanked portion of the drive pulse and/or at a time after an effect of a previous active portion of the drive pulse has decayed and/or faded.

Typically, sampling during active periods is coordinated to occur at close proximity in time to a sample taken during a dormant point of time. According to some embodiments of the present invention, for each pair of sampling events, e.g. during a dormant period and then an active period, amplitude of output sampled during the dormant period is subtracted from amplitude of output sampled during the active period to suppress the noise from output sampled during the active period.

According to some embodiments of the present invention, intermittently blanking portions of a triggering pulse and/or applying a triggering pulse formed, defined and/or constructed with alternating AC and DC sections is additionally or alternatively used for concurrently and/or substantially simultaneously sampling output responsive to driving more than one conductive line at a time. According to some embodiments of the present invention a plurality of triggering pulses transmitted each on a different conductive line are interlaced so that only one drive signal and/or drive line is active at a specific time. The present inventor has found that by interlacing active periods of a plurality of drive pulses transmitted over different lines, time domain multiplexing can be applied to sample output in response to each of the triggering pulses substantially simultaneous on a sample conductive line. The present inventor has found that by interlacing the active periods of the plurality of drive pulses, the efficiency of the digitizer system may be improved. Optionally, the refresh rate of digitizer sensor can be increased and/or active duty cycle time can be decreased to reduce power consumption. Typically, time domain multiplexing is applied for this purpose. In some exemplary embodiments of the present invention, different frequencies for the triggering pulse are used, so that more than one drive signal and/or drive line can be active at a specific time.

Optionally this also provides for improving efficiency, e.g. increasing the refresh rate of digitizer sensor and/or decreasing active duty cycle time can be decreased to reduce power consumption. Optionally frequency domain multiplexing is also applied for separating responses from the different frequency signals.

Figure 2:
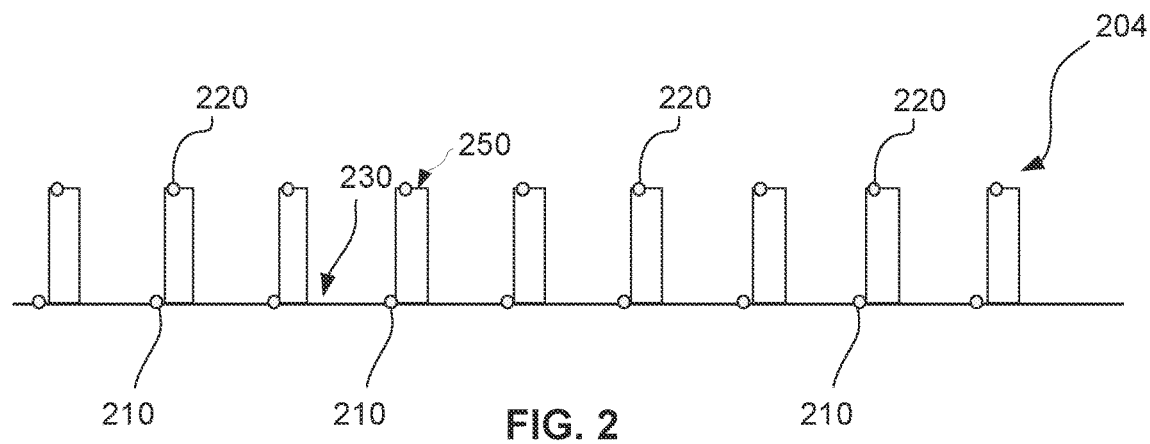
FIG. 2 is a simplified representation of an exemplary drive signal including a plurality of rectangular pulses and exemplary sampling times for sampling a response of the digitizer sensor to the drive signal, in accordance with some embodiments of the present invention.

Reference is now also made to FIG. 2 showing a simplified representation of an exemplary drive signal formed from a plurality of square pulses and exemplary sampling times for sampling a response of the digitizer sensor to the drive signal, in accordance with some embodiments of the present invention. According to some embodiments of the present invention, drive signal 204 is formed from a plurality of pulses 250 separated in time by passive sections 230. Optionally, pulses 250 are shown as rectangular pulses. Alternatively, drive signal 204 is formed from other types of pulses including spiked pulses or cosine square pulses. Typically, passive sections 230 are DC sections.

Optionally, drive signal 204 alternates between passive sections 230 with a steady 0V level during which time a noise signal can be detected, and active sections provided by a rise and drop of pulses 250, e.g. a rise to 10 V and drop to 0V during which time a detection signal can be detected.

According to some embodiments of the present invention, drive signal 204 is used to drive a conductive line, e.g. conductive line 18 of a capacitive based digitizer sensor 26. According to some embodiments of the present invention, during each sampling period of digitizer sensor 26, drive signal 204 is transmitted over one conductive line 21, e.g. a drive line of digitizer sensor 26 and in response output from a plurality of conductive lines 18 crossing drive line 21 is sampled to detect fingertip input (or the like) near one or more junctions 42 formed between the drive line 21 and the conductive lines 18. Typically, output is sampled a predetermined number of times during each sampling period, e.g. between 20 to 200 times over a sampling period of duration between 1 to 100 msec. Alternatively, a drive line is selected from conductive lines 18 and output is sampled from conductive lines 21.

According to some embodiments of the present invention, during a sampling period, sampling events are defined to occur in synchronization with occurrences of pulses 250 in drive signal 204. In some exemplary embodiments, a plurality of sampling events 210 are timed to occur in response to passive sections 230 and a plurality of sampling events 220 are timed to occur in response to active sections of pulses 250, e.g. in response to a rise of pulse 250. According to some embodiment of the present invention, time domain multiplexing is used to interlace sampling events 210 with sampling events 220 so that both the noise signal and the detection signal are sampled on the same line and substantially simultaneously. Optionally, the noise signal as sampled substantially simultaneous with the detection signal provides a close and/or valid representation of the noise component in the detection signal.

Optionally, sampling events are timed to alternate between sampling events 210 and sampling events 220. According to some embodiments of the present invention, sampling events are timed so that pairs of sampling events 210 and 220 occur in close proximity to each other so that noise estimation from sampling event 210 can be made in close proximity in time to signal detection from sampling event 220. In some exemplary embodiments, sampling events 210 are defined to occur toward an end of passive section 230 so the digitizer sensor can reach steady-state after excitation in response to a previous pulse 250. Optionally, sampling events 210 are timed to occur directly before or at an onset of pulse 250 as shown in FIG. 2. Alternatively and/or additionally, sampling 210 events are timed to occur after a response to a previous pulse 250 decays. In some exemplary embodiments, sampling events 220 are timed to occur in response to a rising edge of pulse 250, e.g. soon after pulse 250 reaches a maximum level as shown in FIG. 2. Alternatively and/or additionally, sampling events are timed to occur in response to a falling edge of pulse 250, e.g. soon after pulse 250 falls to a minimum and/or steady-state level, e.g. 0V. Typically, amplitude of output obtained over a sampling event 210 is subtracted from amplitude of output obtained from its paired sampling event 220. Optionally, sampling events 220 are timed to occur in response to a rising edge of pulse 250 and then a falling edge of pulse 250. Optionally, a differential between the falling and raising edge is determined to gain twice the signal. Optionally, output from raising and falling edge is averaged.

In other exemplary embodiments, noises in substantially a same frequency as repetition rate of pulses 250 are suppressed by accumulating and averaging output after subtracting the noise component. Optionally, the sum of the undesired artifacts will be suppressed by reducing output of the detection signal with the accumulated averages. Optionally, the sampling rate over a sampling period is selected to avoid frequencies of known sources of noise, e.g. noises generated by a power supply of the host 22, noises generated by fluorescent light, LCD noises of display 45, finger-injected noise, or the like.

According to some embodiments of the present invention, drive signal 204 provides for driving fingertip detection (or the like) at specific points in time corresponding to sampling events 220 and also provides for using the time period 230 between sampling events 220 for detecting noise signals during a steady state of the digitizer sensor.

Figure 3:
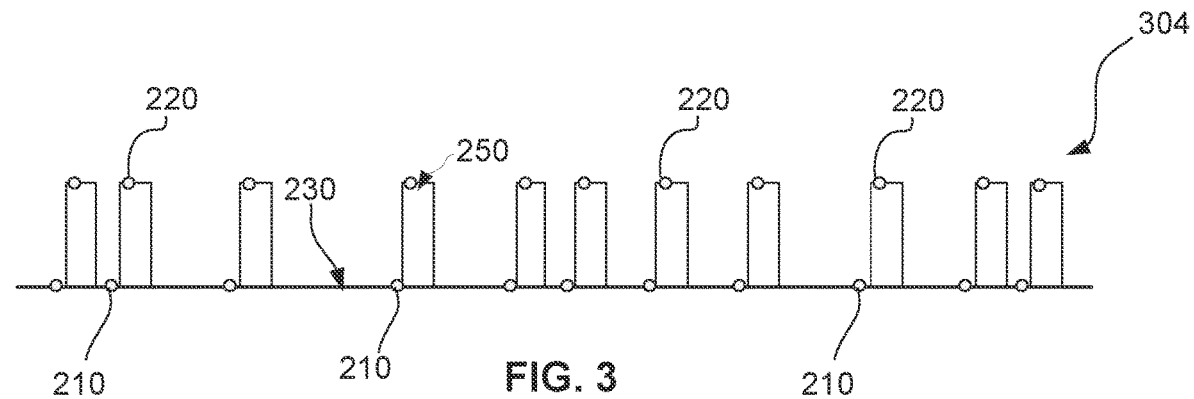
FIG. 3 is a simplified representation of an exemplary drive signal including asymmetrically time spaced rectangular pulses, and exemplary sampling times for sampling a response of the digitizer sensor the drive signal, in accordance with some embodiments of the present invention.

Reference is now made to FIG. 3 showing simplified representations of an exemplary drive signal including asymmetrically time spaced rectangular pulses, and exemplary sampling times for sampling a response of the digitizer sensor to the drive signal, in accordance with some embodiments of the present invention. According to some embodiments of the present invention, a drive signal 304 for triggering a digitizer sensor includes a plurality of asymmetrically or irregularly spaced rectangular pulses 250 separated by passive sections 230. Optionally, durations of the passive sections 230 are defined to be irregular, e.g. random. According to some embodiments of the present invention, sampling events 210 for sampling drive signal 304 are defined to occur closely and/or directly before termination of each passive section 230 and sampling events 220 are defined to occur closely and/or directly after termination of each passive section 230. Optionally, drive signal 204 with random and/or variable frequency is used to avoid intermodulation distortion. Optionally, intermodulation distortion is suppressed by averaging the measured values over time, or in the frequency domain.

Figure 4:
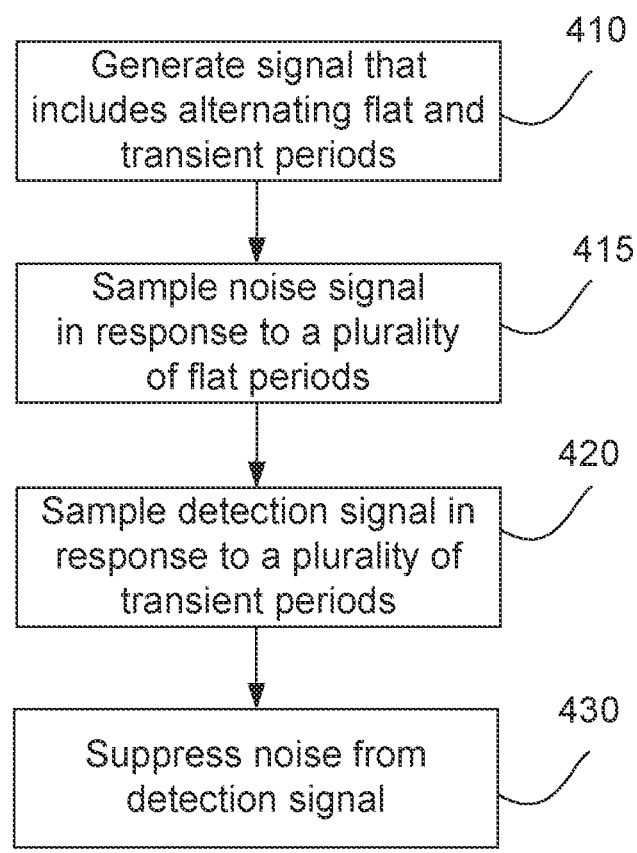
FIG. 4 is a simplified flow chart of an exemplary method for suppressing noise during capacitive based detection in accordance with some embodiments of the present invention.

Reference is now made to FIG. 4 showing a simplified flow chart of an exemplary method for sampling output from a capacitive based digitizer sensor in accordance with some embodiments of the present invention. According to some embodiments of the present invention, a drive signal that includes alternating flat and transient periods and/or sections is defined and generated (block 410). Typically, a frequency, amplitude, shape and/or duration of the transient sections are selected to provide adequate detection of a fingertip or like object interacting with a digitizer sensor based on system requirements. Typically, duration of the flat periods, e.g. DC periods is selected to provide adequate time for an effect of previous triggering event on the digitizer sensor to decay and sampling during a steady-state and/or passive period of the digitizer sensor. According to some embodiments of the present invention, sampling events during a sampling period are defined to be synchronized with a pattern of the drive signal so that sampling occurs both during dormant periods (block 415) and active periods (block 420) of the drive signal. Typically, synchronization is defined so that the digitizer system alternates between sampling during dormant and active periods of the drive signal.

Typically, events during dormant periods are used to sample the noise signal and are defined to occur close to a subsequent active period and/or after a pre-defined lapse from previous active period. According to some embodiments of the present invention, a detection signal for detecting presence of a fingertip or the like is sampled during active periods. The present inventor has found that by time domain multiplexing and/or interlacing the sampling as described herein, the noise signal can be sampled substantially simultaneously with the detection signal and that the noise signal as detected can be considered a close and/or valid representation of the noise component of the detection signal. According to some embodiments of the present invention, output obtained over dormant periods of the digitizer sensor is used to suppress noise in output detected over active periods of the digitizer sensor (block 430). Optionally, noise is suppressed by subtracting amplitude of output from each noise sampling event from amplitude of output from a subsequent and/or close detecting sampling event, e.g. obtained over an active period. Optionally, the passive sections provide for sampling two or more noise signals for each detection signal. Optionally, the plurality of noise signals are averaged and/or otherwise processed and used to suppress noise in the corresponding and/or close sampling event for sampling a detection signal.

Figure 5A:
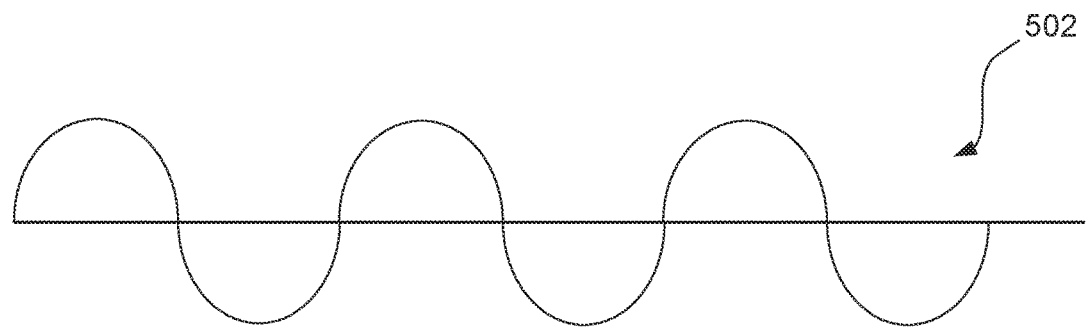
FIGS. 5A, 5B and 5C are simplified representations of an exemplary oscillating signal, a blanking pattern and resultant drive signal, respectively, all in accordance with some embodiments of the present invention.
Figure 5B:
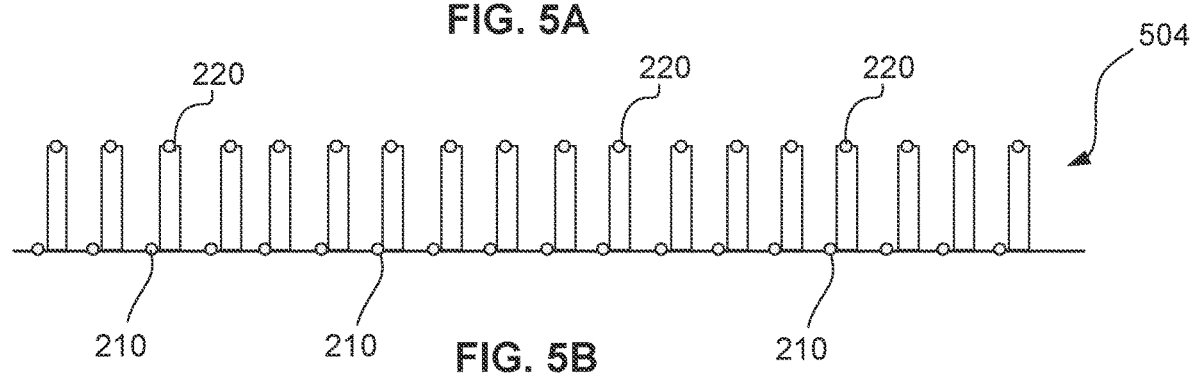
Figure 5C:
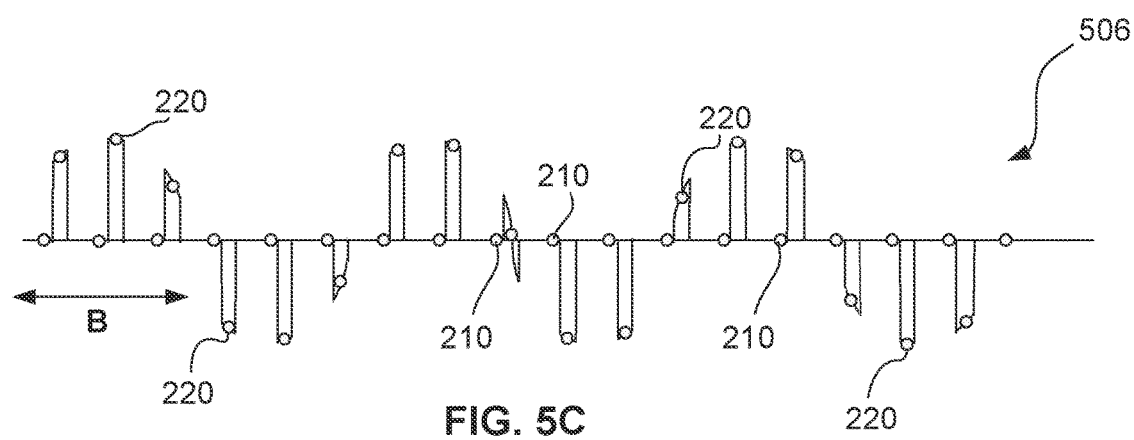

Reference is now made to FIGS. 5A, 5B and 5C showing simplified representations of another exemplary oscillating signal, a blanking pattern and resultant drive signal respectively, all in accordance with some embodiments of the present invention. According to some embodiments of the present invention, a drive signal 506 is formed by an oscillating signal, e.g. sine wave 502 that is intermittently blanked with flat and/or DC sections based on a defined blanking pattern 204. According to some embodiments of the present invention, a sine wave 502 is used to generate a drive signal 506. According to some embodiments of the present invention a blanking pattern 504 is used to define DC sections in drive signal 506 that can be used for detecting a noise signal. Optionally, drive signal 506 is formed by multiplying sine wave 502 with blanking pattern 504. According to some embodiments of the present invention, during a sampling period, sampling events are defined to occur in synchronization with pattern 504 so that output is sampled a number of times in response to oscillating signal 502 being blanked, e.g. sampling events 210 and is also sampled a number of times in response to oscillating signal 502 being passed, e.g. sampling events 220. Typically, a sampling rate for sampling events 210 and 220 is selected in relation to a frequency of oscillating signal 502. It will be appreciated that reconstruction of the noise signal as well as the detection signal typically improves as the sampling rate increases in relation to frequency of oscillating signal 502.

It is noted that although, a symmetrical blanking pattern 504 is shown, in alternate embodiments of the present invention, blanking patterns that define random or non-symmetric blanking periods can also be used.

Figure 6:
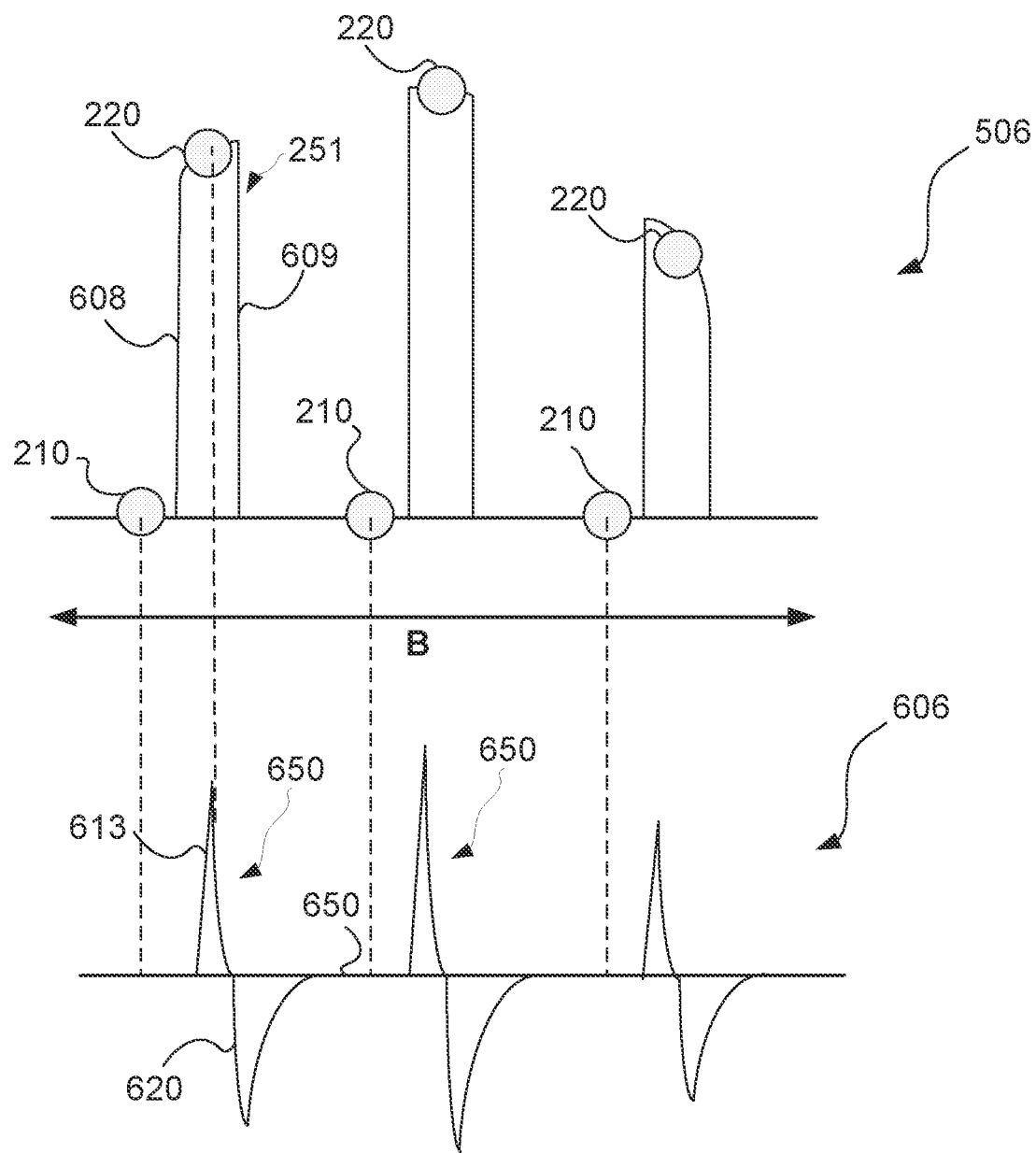
FIG. 6 is a simplified representation of a portion of a drive signal (section B) shown in FIG. 5C and a corresponding response of a capacitive based sensor to receiving the drive signal, all in accordance with some embodiments of the present invention.
Figure 7A:
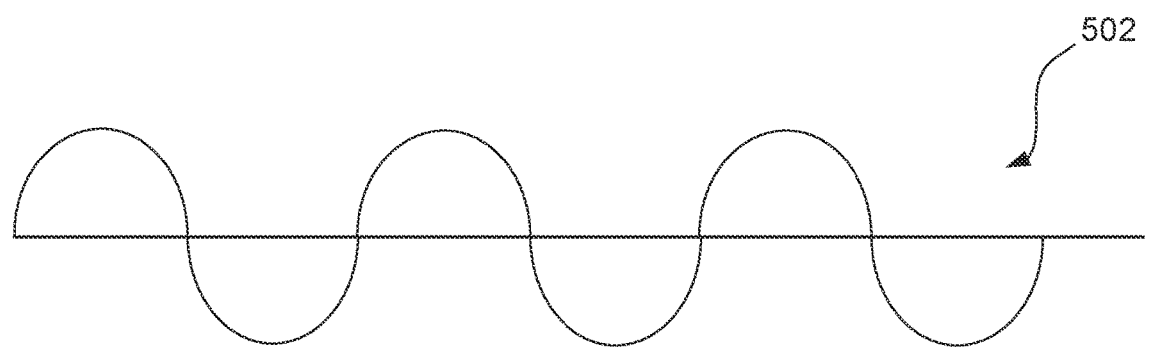
FIGS. 7A, 7B, 7C and 7D are simplified representations of amplitudes of noise and detection signal obtained before noise suppression, and amplitude of the detection signal obtained after noise suppression, all in accordance with some embodiments of the present invention.
Figure 7B:
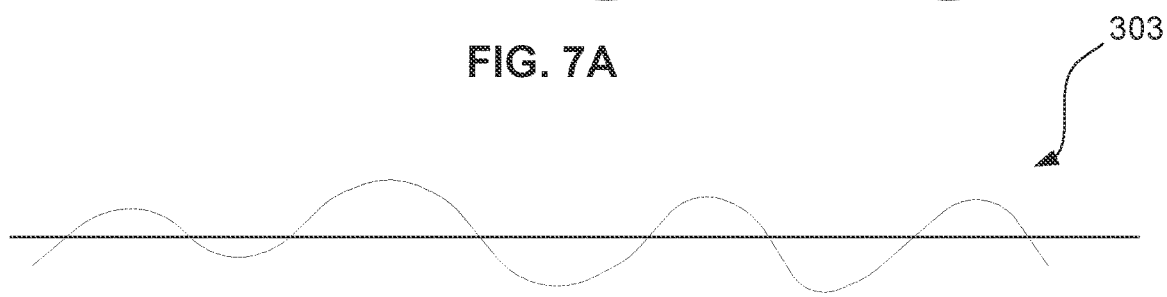
Figure 7C:
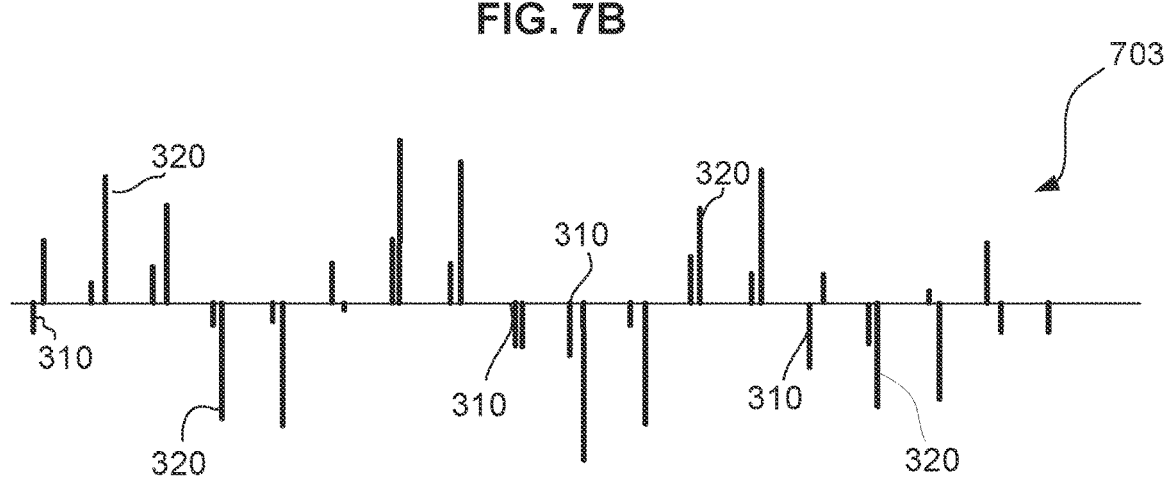
Figure 7D:
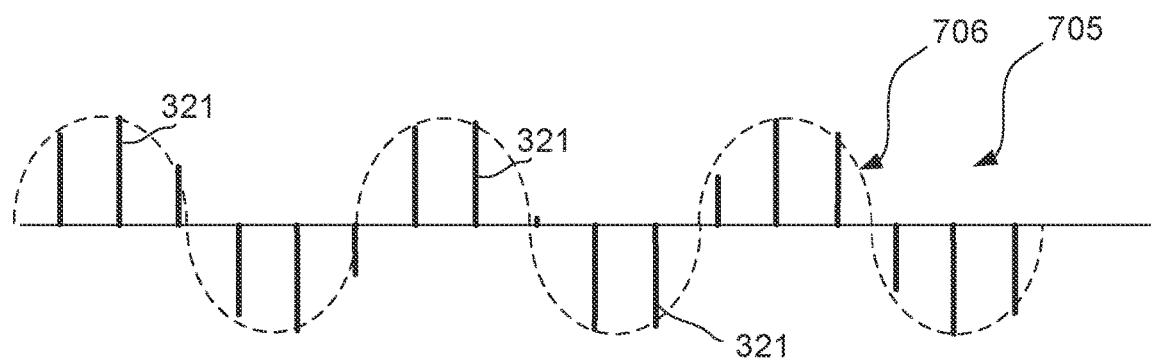

Reference is now made to FIG. 6 showing a simplified representation of a portion of a drive signal (section B) shown in FIG. 5C and a corresponding response of a capacitive based sensor to receiving the drive signal, all in accordance with some embodiments of the present invention. According to some embodiments of the present invention, in response to driving a conductive line with a drive signal 506, output 606 is detected on a conductive line crossing the drive line including a plurality of responses 650. In some exemplary embodiments, in response to a rise 608 of an active section 251 of drive signal 506, a conductive line crossing the drive line responds with a first signal burst 613, e.g. positive burst that subsequently fades while the drive signal is maintained at a substantially maximum value. Typically, in response to a drop in voltage of active section 251, a second burst 620, e.g. a negative burst occurs where the output drops and then rises to a steady state level 650. Alternatively the negative burst occurs prior to the positive burst signal. According to some embodiments of the present invention, sampling events 220 for detecting the detection signal are timed to occur during first signal burst 613. Alternatively and/or additionally, sampling events 220 are timed to occur during second burst 620. According to some embodiments of the present invention, sampling events 210 for detecting noise are timed to occur after decay of second burst 620 and during steady state level 650 of a conductive line sampled so that only a noise signal is detected. Typically, the sampling rate and sampling pattern are defined to accommodate sampling the noise signal during steady state and/or dormant periods of the digitizer sensor.

Reference is now made to FIGS. 7A, 7B, 7C and 7D showing simplified representative amplitudes of noise and detection signal obtained before noise suppression, and amplitude of the detection signal obtained after noise suppression, all in accordance with some embodiments of the present invention. According to some embodiments of the present invention, output 703 obtained in response to a drive signal 502 includes amplitudes 310 of output obtained in response to sampling events 210 that represent amplitude of noise during a passive period of a capacitive based digitizer sensor, and amplitude 320 of output obtained in response to sampling events 220 that represent amplitude of a detection signal. Typically, output obtained from sampling events 210 is output responsive to a noise signal 303 picked up by the digitizer sensor and output obtained from sampling events 320 is output responsive to both drive signal 502 and noise signal 303. Typically, noise signal 303 and the detection signal are sampled from an element of the digitizer sensor that is capacitively coupled to a conductive element triggered. Typically, amplitude 320 includes a noise component due to electromagnetic fields in the surrounding environment and can be separately detected during a passive period of the digitizer sensor. Optionally, the noise component is due to transmission of a stylus that is concurrently interacting with the digitizer sensor and/or is in the vicinity of the digitizer sensor. Optionally, noise suppression by subtraction is turned off during simultaneous finger and stylus detection.

According to some embodiments of the present invention, amplitude 310 is obtained close in time to sampling event 220 and while the digitizer is passive so that it can be used to estimate the noise component in amplitude 320. Optionally, amplitude 310 provides adequate representation of noise components with frequencies that are low compared to time period between paired sampling events 210 and 220. Typically, smaller time period between sampling paired sampling events 210 and 220 provide for representing noise components from a wider range of frequencies, e.g. including higher frequencies.

According to some embodiments of the present invention, a series of amplitudes 705 with suppressed noise is obtained by subtracting each of amplitudes 310 from its paired amplitudes 320. Typically, amplitude 321 is resultant amplitude obtained when amplitude of 310 is subtracted from its paired amplitude 320. Optionally, the detection signal 706 (dotted line) can be reconstructed based on detected amplitudes 321. Typically, the pairs of amplitudes 310 and 320 are defined by proximity between the times that the amplitudes were obtained. Optionally, low pass filtering is subsequently applied to remove higher frequency noise components.

Figure 8:
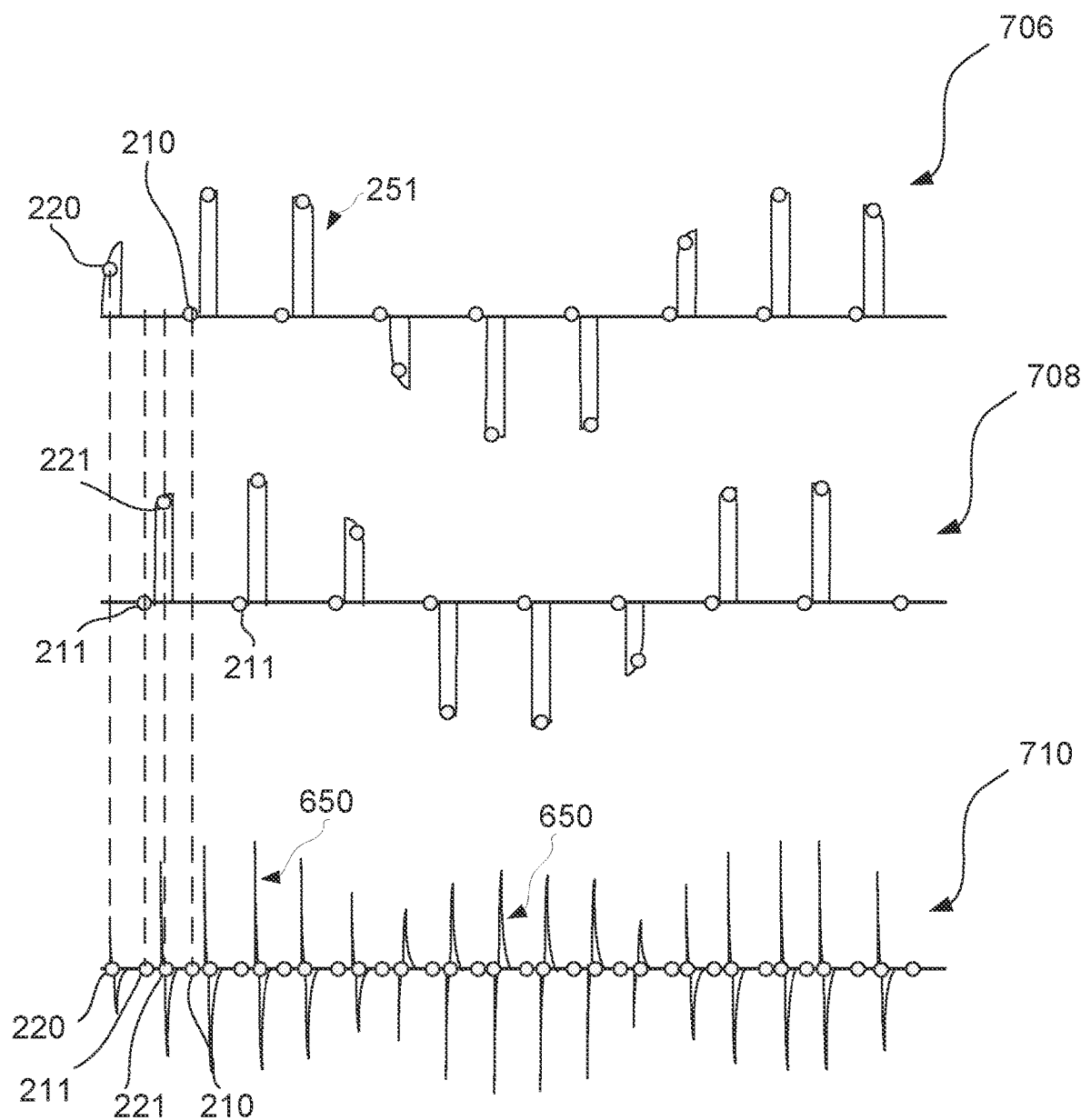
FIG. 8 is a simplified representation of two drive signals that are interlaced and a response of a capacitive based sensor to receiving both drive signals all in accordance with some embodiments of the present invention.

Reference is now made to FIG. 8 showing a simplified representation of two different drive signals that are interlaced and a response of a capacitive based sensor to receiving both drive signals all in accordance with some embodiments of the present invention. According to some embodiments of the present invention, the methods described herein are used to substantially simultaneously trigger and/or drive multiple drive lines by time division multiplexing (TDM). Optionally, drive signal 706 is used to drive a first conductive line and drive signal 708 is used to simultaneously drive a second conductive line. Typically the first and second conductive lines are selected from a same axis, e.g. row or column axis. Optionally, drive signals 706 and 708 are generated from an oscillating signal having a same frequency.

According to some embodiments of the present invention, drive signals 706 and 708 are blanked at different times so that only one drive signal has an active section at any given time. For example, during a sampling event 220 associated with drive signal 706, drive signal 708 is dormant while during a sampling event 221 associated with drive signal 708, drive signal 706 is dormant. The present inventor has found that simultaneously driving of a plurality of conductive lines can be used for reducing an overall scanning period of the digitizer sensor, increasing the refresh rate and/or for reducing the power expenditure required for the overall scanning procedures.

According to some embodiments of the present invention, a noise signal is also detected for each of the drive lines by defining sampling events 210 and 211 in synchronization with steady state and/or dormant periods of the digitizer sensor. Typically, each sampling event 210 is synchronized to occur close to a corresponding sampling event 220 of drive signal 706 while each sampling event 211 is synchronized to occur close to a corresponding sampling event 221, so that each noise signal detected can closely represent a noise component of a corresponding detection signal defined over sampling events 220 and 221 respectively.

According to some embodiments of the present invention, output 710 sampled on a cross line includes sampling events 220 corresponding to an active period of drive signal 706 interlaced with sampling events 221 corresponding to an active period of drive signal 708. Optionally, sampling events 210 and 211 are also included to detect output during dormant periods of the digitizer for estimating the noise on the lines at a time that is in close proximity to each of sampling events 220 and 221. Output 710 schematically represents an ideal situation where no output is detected during sampling events 210 and 211 and outputs obtained during sampling events 220 and 221 closely follow drive signals 706 and 708. Typically, noise signals are picked up by the digitizer sensor so that output obtained during sampling events 220 and 221 may not typically follow drive signals 706 and 708 and output is also detected during sampling events 210 and 211. Optionally, noise suppression is provided by subtracting amplitude detected over sampling event 210 from amplitude detected over sampling event 220 and subtracting amplitude detected over sampling event 211 from amplitude detected over sampling event 221.

According to some embodiments of the present invention, the number of drive lines that may be triggered substantially simultaneously is approximately equal to the ratio between the time difference between two consecutive sampling events 220 (and/or two consecutive sampling events 221) and a time it takes for a response 650 to decay.

According to some embodiments of the present invention, two or more of drive signals 706 and 708 are blanked at the same time but are generated from oscillating signals with different frequencies, e.g. orthogonal frequencies. According to some embodiments of the present invention frequency domain multiplexing is applied for separately obtaining output from each of the drive signals as described for example in incorporated U.S. Pat. No. 7,902,840. Optionally, frequency domain multiplexing can be used in place or in addition to time domain multiplexing.

According to some embodiments of the present invention, a detection signal detected in response to drive signal and a detection signal detected in response to a drive signal are reconstructed using a sample and hold method. Optionally, noise suppression is applied as described for example in reference to FIGS. 7A and 7B prior to applying sample and hold. In some exemplary embodiments, low pass filtering is subsequently applied on the reconstructed signals so as to improve reconstruction of the detection signals.

Figure 9:
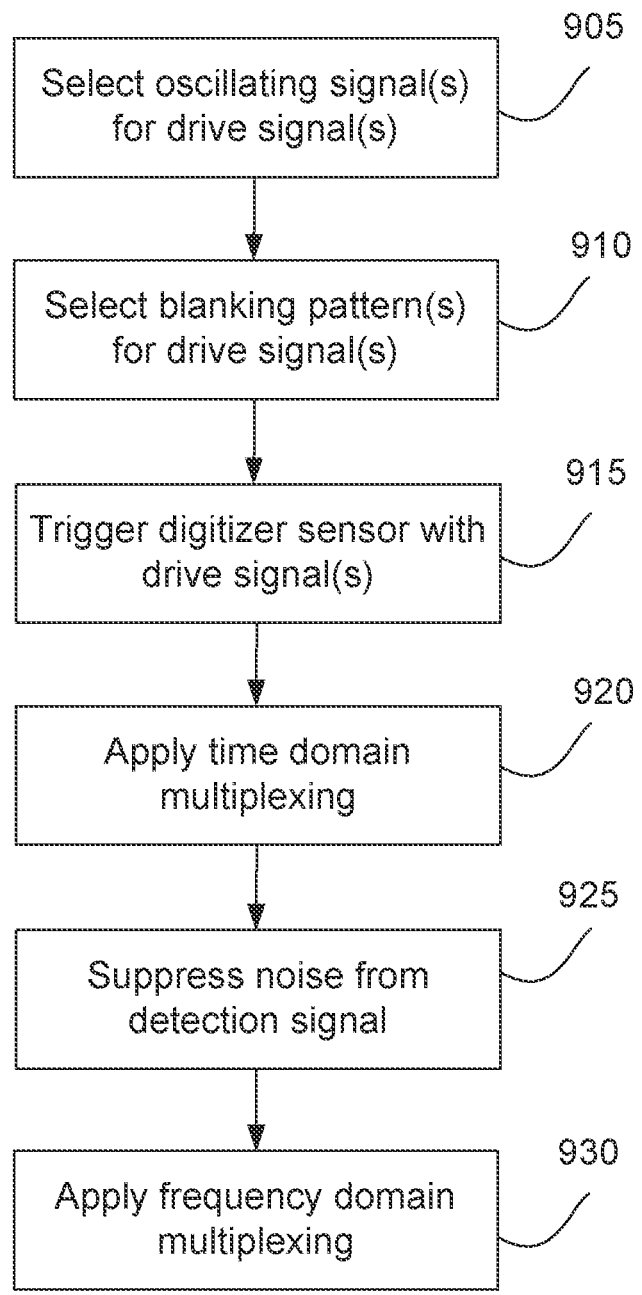
FIG. 9 is a simplified flow chart of an exemplary method for capacitive based detection in accordance with some embodiments of the present invention.

Reference is now made to FIG. 9 showing a simplified flow chart of an exemplary method for capacitive based detection in accordance with some embodiments of the present invention. According to some embodiments of the present invention, one or more oscillating signals for driving detection in a capacitive based digitizer system is selected (block 905). Typically, a frequency, amplitude and shape of the oscillating signal is selected to provide adequate detection of a fingertip or like object interacting with a digitizer sensor based on system requirements. Optionally, a plurality of oscillating signals each with a different frequency, e.g. orthogonal frequency is selected. According to some embodiments of the present invention, one or more blanking patterns are selected for blanking portions of the oscillating signals with a DC signal (block 910). According to some embodiments of the present invention, the one or more drive signals are applied to trigger a digitizer sensor, e.g. digitizer sensor 26 (block 920). Optionally, a plurality of drive signals are simultaneously applied to trigger the digitizer sensor. Optionally, blanking patterns are selected so that at most one drive signal provides triggering at a time. According to some embodiments of the present invention, time domain multiplexing is applied to sample output obtained from each of a plurality conductive elements of digitizer sensor 26 that are capacitively coupled with a conductive element on which the one or more drive signals were applied (block 920). In some exemplary embodiments time domain multiplexing is applied to sample output during passive and active periods of the triggering signal as described herein. In some exemplary embodiments time domain multiplexing is applied to sample output responsive to each of a plurality of drive signals that are applied simultaneously as described herein.

Optionally, noise is suppressed from signals detected during the active periods of the digitizer sensor as described herein (block 925).

According to some embodiments of the present invention, noise in the detection signal is suppressed by reducing and/or subtracting amplitude of the detection signal at defined frequencies for detection, e.g. fingertip detection by amplitude of the noise signal at those defined frequencies. Optionally, additional noise suppression methods are applied, e.g. low pass filtering is applied to further suppress noise on the detection signal. Optionally, peak detection is applied to detect local peaks of the measured output, after subtracting output obtained during a dormant period from output obtained during an active period. Optionally, the two values may be held using a sample and hold circuit, thus providing an analog output signal which can be further processed.

In some exemplary embodiments, drive signals generated with different frequencies, e.g. orthogonal frequencies have similar blanking patterns and/or have blanking patterns that intermittently provide for triggering the digitizer sensor with both frequencies at the same time. According to some embodiments of the present invention, frequency domain multiplexing is applied to separate response from the different drive signals (block 930). Optionally, noise suppression is performed frequency domain multiplexing.

The disclosed method may be further enhanced for better high-frequency noise immunity, by averaging two or more noise-only samplings and processing them. For example, two or more samples may be taken, wherein at least one is taken before the excitation and at least one after the excitation effect has faded. In another example, two or more samples may be taken before the excitation or after the excitation effect has faded. When multiple such samples are available, the noise can be evaluated as their average. In further embodiments, one or more results having extreme values may be discarded, and the other results may be averaged or otherwise combined.

The terms "comprises", "comprising", "includes", "including", "having" and their conjugates mean "including but not limited to".

The term "consisting of" means "including and limited to".

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination or as suitable in any other described embodiment of the invention. Certain features described in the context of various embodiments are not to be considered essential features of those embodiments, unless the embodiment is inoperative without those elements.

What is claimed is:

1. A method comprising:
   generating an oscillating signal including active sections separated in time by flat sections that represent a blanking pattern when a digitizer sensor is in a passive state, the blanking pattern blanking portions of the oscillating signal with a direct current signal for detecting a noise signal;
   sampling outputs provided to a conductive element, wherein a first sample event in a pair of sampling events of the sampling is timed to take place before a termination of the flat sections of the oscillating signal and a second sample event in the pair of sampling events is timed to take place after the termination of the flat sections of the oscillating signal; and
   using a first output sampled associated with the flat sections to suppress noise in a second output sampled associated with the active sections.

2. The method according to claim 1, further comprising timing sampling events of the sampling to alternate between occurring in response to the active sections of the oscillating signal and occurring in response to the flat sections of the drive signal.

3. The method according to claim 1, further comprising:
   generating a plurality of oscillating signals, wherein each drive signal includes active sections separated in time by flat sections; and
   applying time domain multiplexing for sampling outputs in response to the plurality of oscillating signals on the conductive element.

4. The method according to claim 3, wherein each of the plurality of oscillating signals is periodically interrupted by a flat signal.

5. The method according to claim 4, wherein a same oscillating frequency of the oscillating signal is used to generate drive signals; and
   wherein at least two drive signals have an oscillating signal with different oscillating frequency.

6. The method according to claim 1, further comprising subtracting amplitude of the first output sampled in response to the flat sections from an amplitude of the second output sampled in response to the active sections of the oscillating signal, wherein the subtracting is performed between pairs of contiguous outputs.

7. The method according to claim 1, wherein the blanking pattern defines the flat sections in the oscillating signal that are used for detecting the noise signal.

8. The method according to claim 1, further comprising timing sampling events of the sampling occurring in response to the flat sections to occur after responses of the conductive element to previous active sections of the oscillating signal have faded.

9. The method according to claim 1, further comprising timing sampling events of the sampling to alternate between occurring twice in response to each of a plurality of the active sections of the oscillating signal and occurring once in response to each of a plurality of the flat sections of the oscillating signal.

10. The method according to claim 1, wherein a drive signal is generated by the oscillating signal that is intermittently blanked with the flat sections based on the blanking pattern.

11. The method according to claim 10, wherein the oscillating signal is a sine wave or a cosine wave.

12. A system comprising:
    a digitizer sensor; and
    a controller configured for:
      generate an oscillating signal including active sections separated in time by flat sections that represent a blanking pattern when the digitizer sensor is in a passive state, the blanking pattern blanking portions of the oscillating signal with a direct current signal for detecting a noise signal;
      sample outputs provided to a conductive element, wherein a first sample event in a pair of sampling events of the sampling is timed to take place before a termination of the flat sections of the oscillating signal and a second sample event in the pair of sampling events is timed to take place after the termination of the flat sections of the drive signal; and use a first output sampled associated with the flat sections to suppress noise in a second output sampled associated with the active sections.

13. The system of claim 12, wherein the conductive element comprises a first set of parallel conductive lines and a second set of parallel conductive lines, the first and second set of parallel conductive lines arranged in a grid pattern.

14. The system of claim 12, wherein the controller is configured to subtract an amplitude of the first output sampled in response to the flat sections from an amplitude of the second output sampled in response to the active sections of the oscillating signal.

15. The system of claim 14, wherein subtracting the amplitude of the first output from amplitude of the second output is performed between pairs of contiguous outputs.

16. The system of claim 12, wherein the controller is configured to time sampling events of the sampling to alternate between occurring in response to the active sections of the oscillating signal and occurring in response to the flat sections of the oscillating signal.

17. A device comprising:

a memory configured to store characterization of an oscillating signal; and a circuit configured to:

generate the oscillating signal including active sections separated in time by flat sections that represent a blanking pattern when a digitizer sensor is in a passive state, the blanking pattern blanking portions of the oscillating signal with a direct current signal for detecting a noise signal;

sampling outputs provided to a conductive element, wherein a first sample event in a pair of sampling events of the sampling is timed to take place before a termination of the flat sections of the oscillating signal and a second sample event in the pair of sampling events is timed to take place after the termination of the flat sections of the oscillating signal; and using a first output sampled associated with the flat sections to suppress noise in a second output sampled associated with the active sections.

18. The device of claim 17, wherein the circuit is further configured to time sampling events of the sampling to alternate between occurring in response to the active sections of the oscillating signal and occurring in response to the flat sections of the oscillating signal.

19. The device of claim 17, wherein the circuit is further configured to:

generate a plurality of oscillating signals, wherein each oscillating signal includes active sections separated in time by flat sections; and apply time domain multiplexing for sampling outputs in response to the plurality of oscillating signals on the conductive element.

20. The device of claim 17, wherein the circuit is further configured to time sampling events of the sampling to alternate between occurring twice in response to each of a plurality of the active sections of the oscillating signal and occurring once in response to each of a plurality of the flat sections of the oscillating signal.

* * * * *